United States Patent
Berk

(10) Patent No.: US 9,680,916 B2
(45) Date of Patent: Jun. 13, 2017

(54) METHODS AND SYSTEMS FOR DISTRIBUTION AND RETRIEVAL OF NETWORK TRAFFIC RECORDS

(71) Applicant: FlowTraq, Inc., Lebanon, NH (US)

(72) Inventor: Vincent Berk, Lebanon, NH (US)

( * ) Notice: Subject to any disclaimer, the term of this patent is extended or adjusted under 35 U.S.C. 154(b) by 301 days.

(21) Appl. No.: 14/275,059

(22) Filed: May 12, 2014

(65) Prior Publication Data

US 2015/0039719 A1 Feb. 5, 2015

Related U.S. Application Data

(60) Provisional application No. 61/861,403, filed on Aug. 1, 2013.

(51) Int. Cl.
*H04L 29/08* (2006.01)
*H04L 29/06* (2006.01)

(52) U.S. Cl.
CPC .......... *H04L 67/10* (2013.01); *H04L 63/1416* (2013.01); *H04L 67/22* (2013.01)

(58) Field of Classification Search
CPC ..... H04L 67/10; H04L 67/22; H04L 63/1416; H04L 47/125; H04L 67/42; H04L 63/0823
See application file for complete search history.

(56) References Cited

U.S. PATENT DOCUMENTS

| | | | |
|---|---|---|---|
| 4,034,819 A | 7/1977 | Akers et al. | |
| 4,112,252 A | 9/1978 | Liebler | |
| 4,397,725 A | 8/1983 | Enzer et al. | |
| 4,417,320 A | 11/1983 | Ei | |
| 4,467,650 A | 8/1984 | Hines et al. | |
| 4,520,408 A | 5/1985 | Velasquez | |
| 4,663,666 A | 5/1987 | Bloom | |
| 4,789,547 A | 12/1988 | Song et al. | |
| 4,852,056 A | 7/1989 | Rogers et al. | |
| 4,947,028 A | 8/1990 | Gorog | |
| 4,967,084 A | 10/1990 | Rich et al. | |
| 5,129,092 A | 7/1992 | Wilson | |
| 6,801,503 B1 | 10/2004 | Wetherall et al. | |
| 6,965,574 B1 | 11/2005 | Cook et al. | |
| 7,058,015 B1 | 6/2006 | Wetherall et al. | |
| 7,206,861 B1 * | 4/2007 | Callon | H04L 47/10 370/389 |
| 7,312,071 B2 | 12/2007 | Lu et al. | |
| 7,344,337 B2 | 3/2008 | Simon et al. | |

(Continued)

*Primary Examiner* — Backhean Tiv
(74) *Attorney, Agent, or Firm* — Hyperion Law, LLC; Cynthia M. Gilbert

(57) ABSTRACT

A method includes receiving, by a distribution server, from an exporter device, a plurality of network traffic records. The method includes generating, by the distribution server, a first hash from a first plurality of fields in a first of the plurality of network traffic records and generating a second hash from a second plurality of fields in a second of the plurality of network traffic records. The method includes comparing the first hash and the second hash and determining that the first of the plurality of network traffic records and the second of the plurality of network traffic records relate to a session, based upon the comparison. The method includes transmitting the first and second of the plurality of network traffic records to one of a plurality of worker computing devices selected based on the determination and on at least one of the first and second hash.

8 Claims, 10 Drawing Sheets

(56) References Cited

U.S. PATENT DOCUMENTS

| | | | |
|---|---|---|---|
| 7,359,930 B2 | 4/2008 | Jackson et al. | |
| 7,444,404 B2 | 10/2008 | Wetherall et al. | |
| 7,459,308 B2 | 12/2008 | Lu et al. | |
| 7,475,141 B1 | 1/2009 | Anderson et al. | |
| 7,502,972 B1* | 3/2009 | Chilukuri | G06F 11/3688 714/38.12 |
| 7,529,192 B2 | 5/2009 | Labovitz | |
| 7,596,807 B2 | 9/2009 | Ptacek et al. | |
| 7,758,283 B2 | 7/2010 | Simon et al. | |
| 7,844,696 B2 | 11/2010 | Labovitz et al. | |
| 7,887,259 B2 | 2/2011 | Simon et al. | |
| 7,970,886 B1 | 6/2011 | Wetherall et al. | |
| 7,991,715 B2 | 8/2011 | Schiff et al. | |
| 8,001,271 B1 | 8/2011 | Malan et al. | |
| 8,047,743 B2 | 11/2011 | Simon et al. | |
| 8,103,755 B2 | 1/2012 | Malan et al. | |
| 8,146,160 B2 | 3/2012 | Orr et al. | |
| 8,173,386 B2 | 5/2012 | Hart et al. | |
| 8,271,678 B2 | 9/2012 | Wetherall et al. | |
| 8,463,901 B2 | 6/2013 | Caram | |
| 8,509,086 B2 | 8/2013 | Anderson et al. | |
| 8,549,139 B2 | 10/2013 | Labovitz et al. | |
| 2002/0086382 A1 | 7/2002 | Lu et al. | |
| 2002/0102267 A1 | 8/2002 | Lu et al. | |
| 2002/0107960 A1 | 8/2002 | Wetherall et al. | |
| 2002/0143980 A1 | 10/2002 | Wetherall et al. | |
| 2002/0169283 A1 | 11/2002 | Lu et al. | |
| 2003/0002436 A1 | 1/2003 | Anderson et al. | |
| 2003/0037136 A1 | 2/2003 | Labovitz et al. | |
| 2003/0103992 A1 | 6/2003 | Lu et al. | |
| 2003/0223367 A1* | 12/2003 | Shay | H04L 43/106 370/231 |
| 2004/0004941 A1 | 1/2004 | Malan et al. | |
| 2004/0103211 A1 | 5/2004 | Jackson et al. | |
| 2005/0005017 A1 | 1/2005 | Ptacek et al. | |
| 2005/0018602 A1 | 1/2005 | Labovitz | |
| 2005/0018608 A1 | 1/2005 | Wetherall et al. | |
| 2005/0216956 A1 | 9/2005 | Orr et al. | |
| 2005/0226688 A1 | 10/2005 | Simon et al. | |
| 2006/0089985 A1* | 4/2006 | Poletto | H04L 41/0631 709/224 |
| 2006/0153851 A1 | 7/2006 | Lu et al. | |
| 2006/0242694 A1* | 10/2006 | Gold | H04L 63/1441 726/13 |
| 2007/0171825 A1* | 7/2007 | Roberts | H04L 45/00 370/235 |
| 2007/0174563 A1* | 7/2007 | Staniford | G06F 12/023 711/159 |
| 2008/0016834 A1 | 1/2008 | Lee | |
| 2008/0294770 A1 | 11/2008 | Jackson et al. | |
| 2009/0033683 A1 | 2/2009 | Schiff et al. | |
| 2009/0123910 A1 | 5/2009 | Malick et al. | |
| 2009/0168648 A1 | 7/2009 | Labovitz et al. | |
| 2009/0171766 A1 | 7/2009 | Schiff et al. | |
| 2009/0172030 A1 | 7/2009 | Schiff et al. | |
| 2009/0172730 A1 | 7/2009 | Schiff et al. | |
| 2010/0118714 A1 | 5/2010 | Labovitz | |
| 2010/0157840 A1* | 6/2010 | Sen | H04L 43/0835 370/253 |
| 2011/0081202 A1 | 4/2011 | Simon et al. | |
| 2011/0103239 A1* | 5/2011 | Wong | H04L 43/106 370/252 |
| 2011/0206049 A1* | 8/2011 | Kohn | H04L 47/2441 370/392 |
| 2011/0296002 A1 | 12/2011 | Caram | |
| 2011/0296005 A1 | 12/2011 | Labovitz et al. | |
| 2012/0047248 A1 | 2/2012 | Makhija | |
| 2012/0124087 A1 | 5/2012 | Malan et al. | |
| 2012/0167168 A1 | 6/2012 | Orr et al. | |
| 2012/0207024 A1* | 8/2012 | Kohn | H04L 43/026 370/235 |
| 2012/0208764 A1 | 8/2012 | Tymianski | |
| 2012/0320914 A1* | 12/2012 | Thyni | H04L 49/30 370/389 |
| 2013/0003736 A1* | 1/2013 | Szyszko | H04L 47/2441 370/392 |
| 2013/0028105 A1* | 1/2013 | Chew | H04L 43/12 370/252 |
| 2013/0031605 A1 | 1/2013 | Huston, III et al. | |
| 2013/0055374 A1 | 2/2013 | Kustarz et al. | |
| 2013/0055375 A1 | 2/2013 | Cline et al. | |
| 2013/0263259 A1 | 10/2013 | Huston, III et al. | |
| 2013/0317967 A1 | 11/2013 | Novembre | |
| 2014/0254380 A1* | 9/2014 | Swenson | H04L 47/11 370/235 |
| 2015/0039719 A1* | 2/2015 | Berk | H04L 67/10 709/217 |
| 2015/0281092 A1* | 10/2015 | Benz | H04L 47/125 370/230 |
| 2016/0094451 A1* | 3/2016 | Jain | H04L 45/44 709/241 |
| 2016/0094643 A1* | 3/2016 | Jain | H04L 45/44 709/226 |
| 2016/0294935 A1* | 10/2016 | Hong | H04L 47/125 |
| 2016/0328159 A1* | 11/2016 | Coddington | G06F 3/0613 |

* cited by examiner

200

| Plurality of Fields 216 | Data |
|---|---|
| Client IP Address | 10.0.0.1 |
| Client Port | 80 |
| Protocol | HTTP |
| Server IP Address | 192.168.1.2 |
| Server Port | 80 |
| Exporter IP Address | 192.168.1.1 |
| Exporter Version | 9 |

Network Traffic Record 214a

200

HASH 218a

| Data from Plurality of Fields 216a | Key | Hash Output |
|---|---|---|
| 10.0.0.1, 192.168.1.2 | | |

HASH 218b

| Data from Plurality of Fields 216b | Key | Hash Output |
|---|---|---|
| 10.0.0.1, 192.168.1.2 | | |

HASH 218c

| Data from Plurality of Fields 216c | Key | Hash Output |
|---|---|---|
| 10.0.0.2, 192.168.1.3 | | |

*Fig. 2C*

METHODS AND SYSTEMS FOR DISTRIBUTION AND RETRIEVAL OF NETWORK TRAFFIC RECORDS

CROSS-REFERENCE TO RELATED APPLICATIONS

This application claims priority from U.S. Provisional Patent Application No. 61/861,403, filed on Aug. 1, 2013, entitled "Method and System for Achieving Unique-Count of Network Objects in Very High Volume Networks," which is hereby incorporated by reference and in its entirety.

BACKGROUND

The disclosure relates to computer network traffic records. More particularly, the methods and systems described herein relate to distribution and retrieval of network traffic records.

In conventional systems, analyzing computer network traffic records, such as NetFlow or sFlow records, becomes increasingly difficult as traffic volumes grow and as the number of computing devices deployed to perform the analyses increases. Conventional approaches to managing large volumes of data, such as sampling network traffic data instead of collecting each individual network traffic record, do not typically provide sufficient information to perform analysis after the collection of the data has completed. For example, if an administrator attempts to perform a query of network traffic data after data samples were collected and the samples do not include the particular type of data needed to respond to the query, or do not include sufficient data to respond to the query, conventional systems do not provide functionality for accessing the network traffic data at that point.

Conventional systems that provide functionality for capturing an entire body of network traffic data typically require additional computing devices to capture and analyze the data. However, such conventional systems do not typically provide functionality for scalable, efficient distribution of the data or for performing analytical queries across multiple computing devices. For example, unique counts of network entities are particularly difficult to calculate in conventional systems, but are of particular utility to network operators. Examples of powerful queries that are challenging to obtain for an arbitrary timeframe in a conventional system include:
1) ranking the top IP addresses on a network based on the number of other unique IP addresses contacted, indicating potential botnets and scans;
2) ranking the top Autonomous System destinations on a network based on the highest number of unique client IP addresses, to inform routing decisions; and
3) ranking the top IP addresses based highest number of unique destination ports that each IP address has used, indicating potential network reconnaissance.

BRIEF SUMMARY

In one aspect, a method for distributing network traffic records includes receiving, by a distribution server, from an exporter device, a plurality of network traffic records. The method includes generating, by the distribution server, a first hash from a first plurality of fields in a first of the plurality of network traffic records. The method includes generating, by the distribution server, a second hash from a second plurality of fields in a second of the plurality of network traffic records. The method includes comparing, by the distribution server, the first hash, and the second hash. The method includes determining, by the distribution server, that the first of the plurality of network traffic records and the second of the plurality of traffic records relate to a session, based upon the comparison. The method includes transmitting, by the distributions server, the first of the plurality of network traffic records and the second of the plurality of network traffic records to one of a plurality of worker computing devices selected based on the determination and on at least one of the first hash and the second hash.

In another aspect, a method includes transmitting, by a distribution computer in a computer network, to each of a plurality of worker computers in the computer network, a request for an enumeration of Internet Protocol (IP) addresses ranked according to a criterion. The method includes receiving, by the distribution computer, from a first of the plurality of worker computers, a first partial enumeration of the requested IP addresses ranked according to the criterion, the first partial enumeration stored in a hash table. The method includes receiving, by the distribution computer, from a second of the plurality of worker computers, a second partial enumeration of the requested IP addresses ranked according to the criterion, the second partial enumeration stored in a hash table. The method includes generating, by the distribution computer, a combined enumeration including the first partial enumeration and the second partial enumeration, the combined enumeration ranked according to the criterion. The method includes deduplicating, by the distribution computer, the combined enumeration. The method includes providing, by the distribution computer, a network security assessment based on the deduplicated combined enumeration.

BRIEF DESCRIPTION OF THE DRAWINGS

FIG. 2C is a block diagram depicting one embodiment of a plurality of hashes;

DETAILED DESCRIPTION

In some embodiments, the methods and systems described herein relate to distribution and retrieval of network traffic records. Before describing such methods and systems in detail, however, a description is provided of a network in which such methods and systems may be implemented.

Figure 1A:
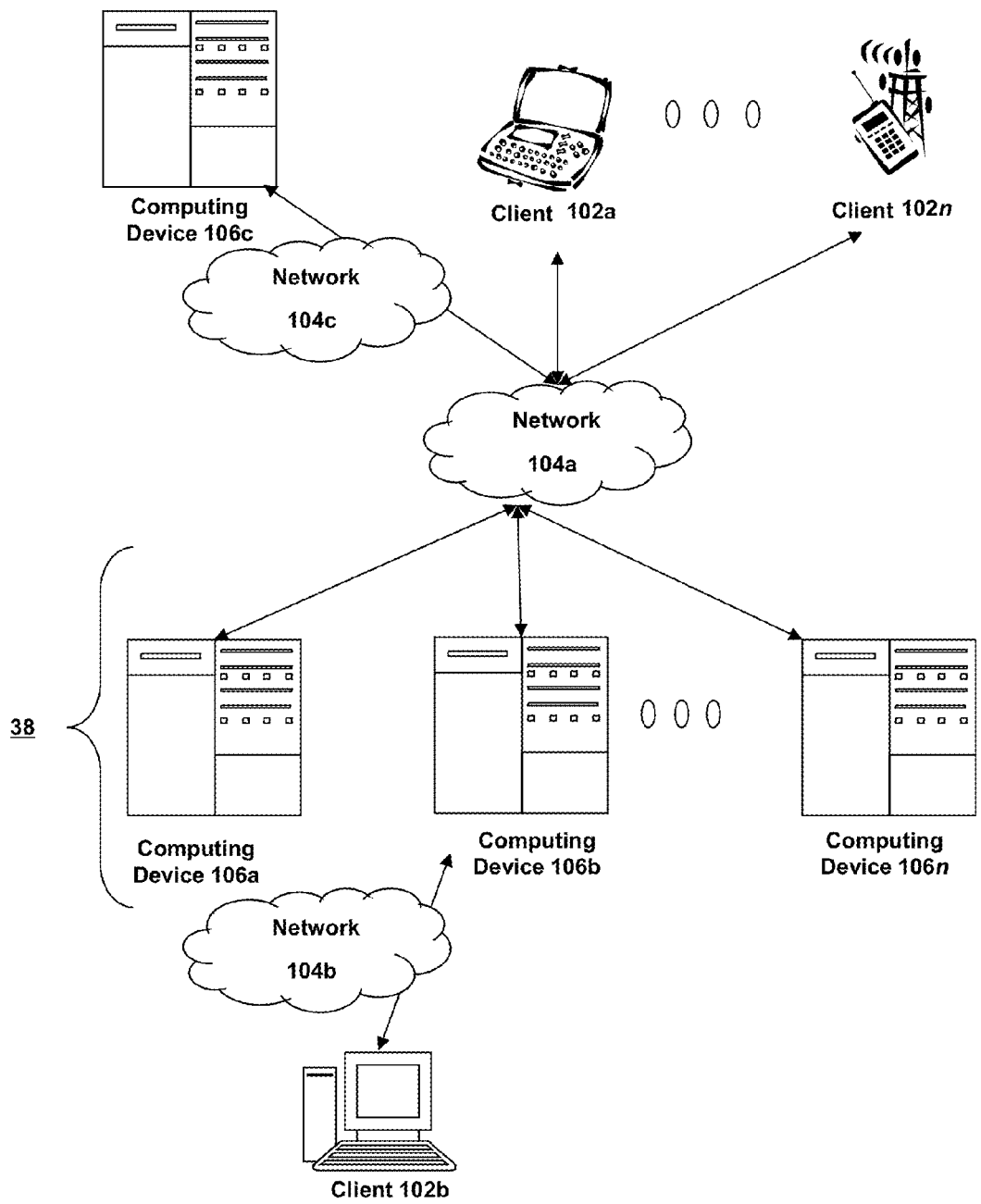
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more computing devices 106a-106n (also generally referred to as server(s) 106 or computing device(s) 106) via one or more networks 104.

The network 104a-n (also generally referred to as network(s) 104) can be a local-area network (LAN), such as a company Intranet, a metropolitan area network (MAN), or a wide area network (WAN), such as the Internet or the World Wide Web. In some embodiments, there are multiple networks 104 between the clients 102 and the computing devices 106. In one of these embodiments, a network 104b may be a private network and a network 104a may be a public network. In another of these embodiments, a network 104a may be a private network and a network 104b a public network. In still another embodiment, the networks 104a and 104b may both be private networks. As shown in FIG. 1A, a client 102b device on a network 104b may connect to other client devices 102a or to other computing devices 106b via one or more networks 104.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a computing device 106 (referred to generally as computing devices 100) can be any workstation, desktop computer, laptop or notebook computer, server (including file servers, application servers, and media servers), portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. In some embodiments, the computing device 100 may have different processors, operating systems, and input devices consistent with the device.

A client 102 may execute, operate or otherwise provide an application, which can be any type and/or form of software, program, or executable instructions, including, without limitation, any type and/or form of web browser, web-based client, client-server application, an ActiveX control, or a JAVA applet, PHP and Javascript, or any other type and/or form of executable instructions capable of executing on client 102.

A computing device 106 may be a file server, application server, web server, proxy server, appliance, network appliance, gateway, application gateway, gateway server, virtualization server, deployment server, SSL VPN server, or firewall. In some embodiments, a computing device 106 provides a remote authentication dial-in user service, and is referred to as a RADIUS server. In other embodiments, a computing device 106 is a blade server. In further embodiments, the computing device may be a virtualized server operating one processor of a multi-processor system. In some embodiments, the functionality described herein is provided as a virtual application using a virtualized AMD64 processor.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash.; the Oracle iPlanet web server products provided by Oracle Corporation of Redwood Shores, Calif.; or the BEA WEBLOGIC products provided by BEA Systems of Santa Clara, Calif.

In some embodiments, the system may include multiple, logically-grouped computing devices 106. In one of these embodiments, the logical group of computing devices may be referred to as a server farm 38. In another of these embodiments, the server farm 38 may be administered as a single entity.

Figure 1B:
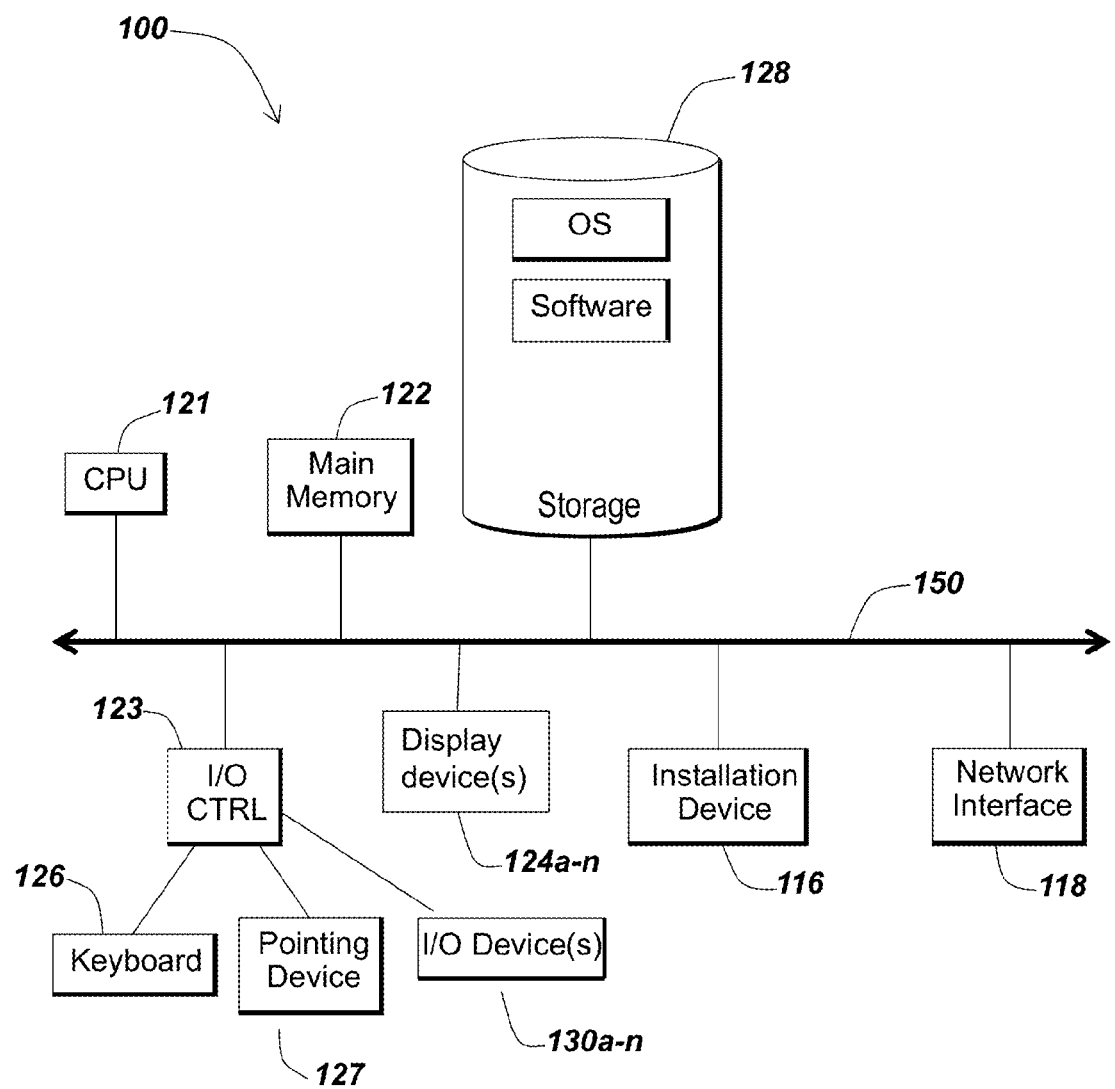
Figure 1C:
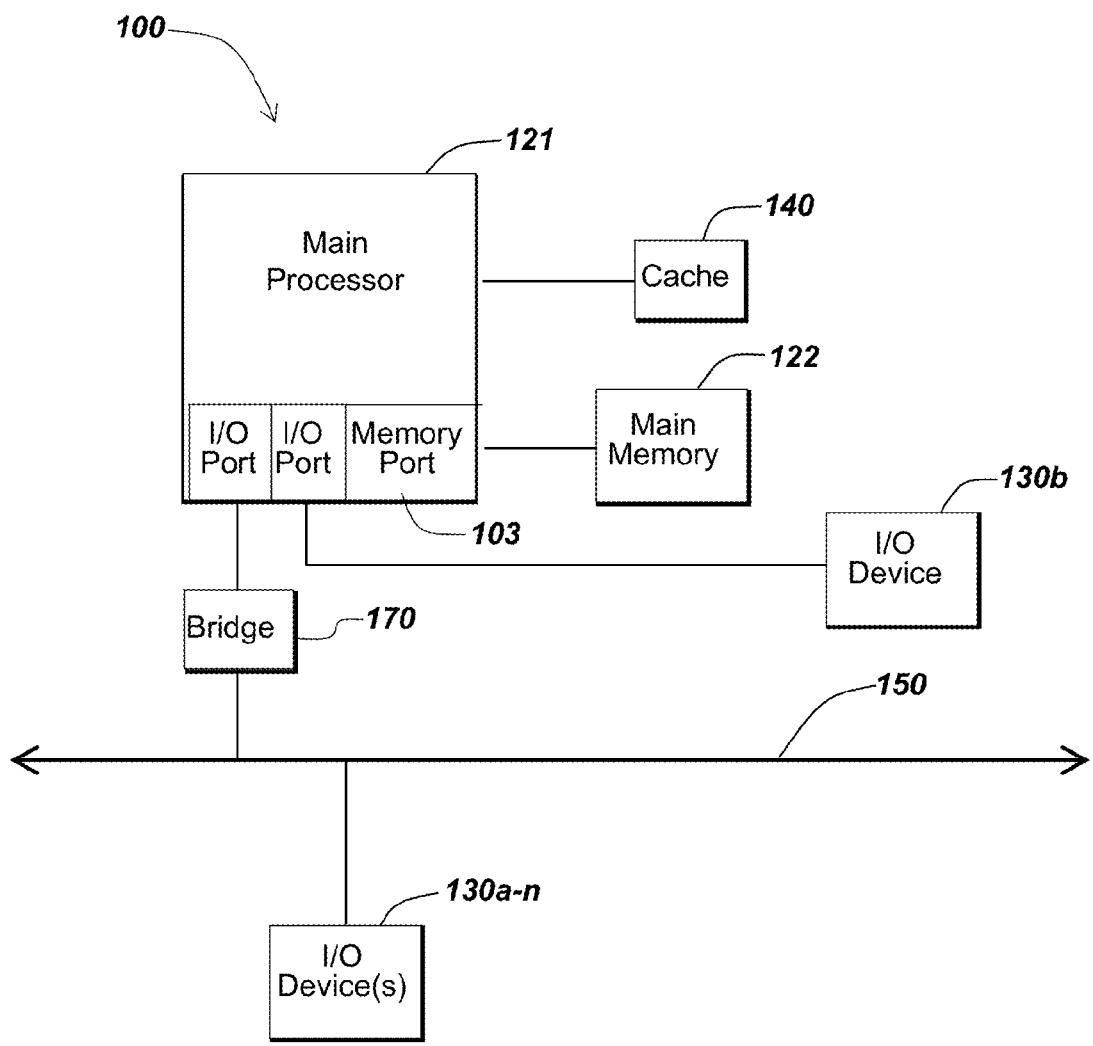

FIGS. 1B and 1C depict block diagrams of a computing device 100 useful for practicing an embodiment of the client 102 or a computing device 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

The computing device 100 may comprise or be connected to one or more of a wide variety of I/O devices 130a-130n, each of which may be of the same or different type and/or form. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, for example, the computing device 100 may provide USB connections (not shown) to receive handheld USB storage devices.

Referring still to FIG. 1B, the computing device 100 may support any suitable installation device 116, such as a floppy disk drive for receiving floppy disks such as 3.5-inch disks, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

Referring again to FIG. 1A, in some embodiments, a client 102b connects to a computing device 106 via one or more networks 104. For example, the client 102b, on a network 104b, may forward a request for data to a computing device 106a; the computing device 106a may be, for example, a gateway computing device that forwards the request on to another computing device 106b, which forwards the request on until the request reaches the intended computing device. When the intended computing device 106 receives the request and prepares the response, the computing device 106 sends the requested data back to the client 102b; the data may travel along the same or a different path of computing devices before reaching the client 102b. Traffic routing techniques for handling such data exchanges between computers over one or more networks will be understood by those of ordinary skill in the art. As will also be understood by those of ordinary skill in the art, permitting such data exchanges between valid users while protecting one or more networked computing devices 100 from malicious users is an on-going challenge.

The systems and methods described herein provide functionality to identify network behavioral anomaly detection (NBAD) through detecting traffic on a network that is unusual, interesting, and/or possibly malicious. In one embodiment, a system provides functionality for analyzing network traffic and generating a 'behavioral fingerprint' to assist users (e.g., administrators) in identifying anomalous communications. Some of the types of anomalous data the present embodiments may detect include: Data Exfiltrations, DDoS attack sources, botnets, spam relays, zero-day worms, host and network scans, DNS amplification attacks, and brute-force attempts within seconds. The systems described herein may also be designed and configured to integrate with third-party platform and automatic threat mitigation solutions.

Figure 2A:
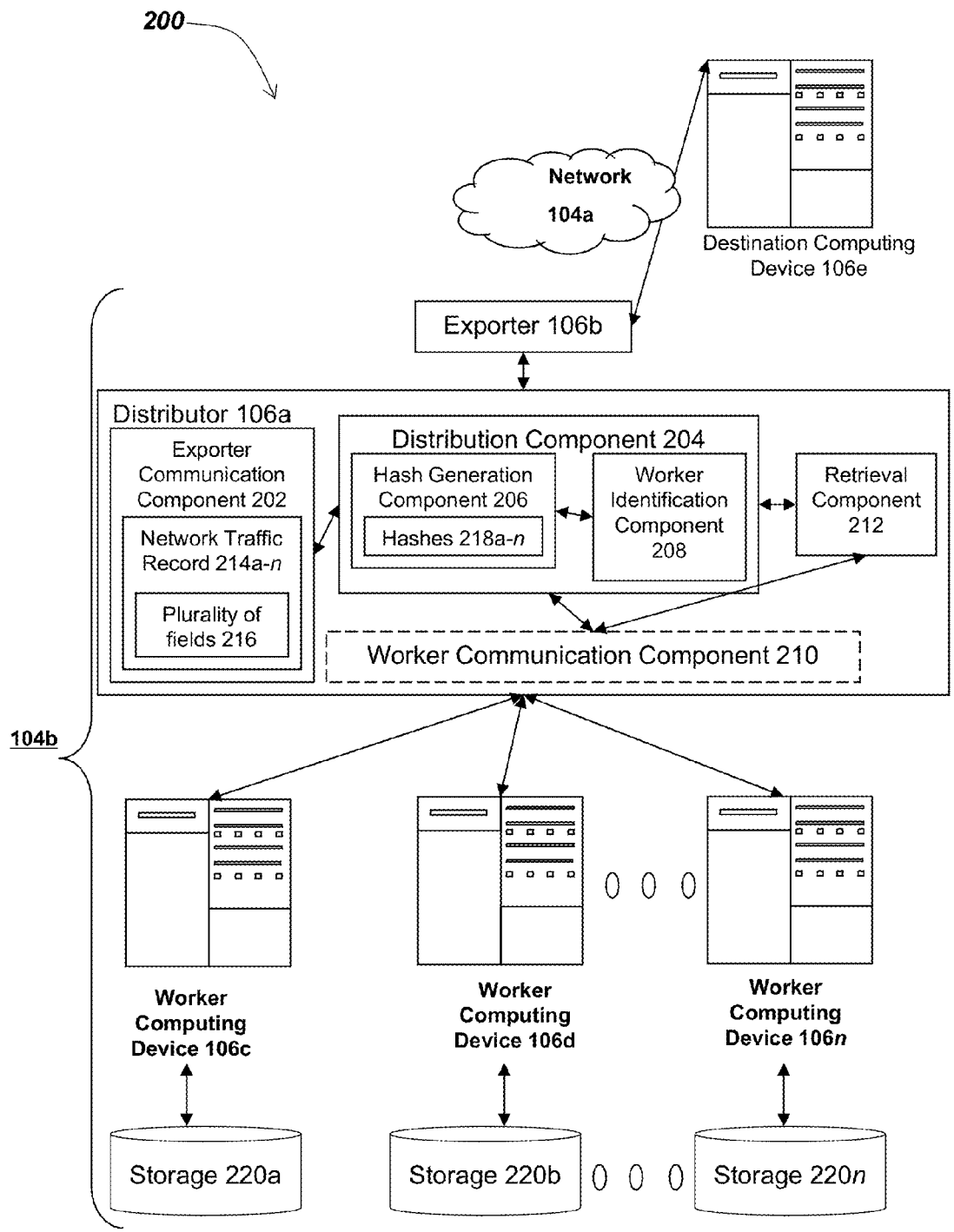
FIG. 2A is a block diagram depicting one embodiment of a system for distribution and retrieval of network traffic records.

Referring now to FIG. 2A, a block diagram depicts one embodiment of a system 200 for distribution and retrieval of network traffic records. In brief overview, the system 200 includes a distributor 106a, an exporter 106b, a plurality of worker computing devices 106a-n, and storage components 220a-n. In some embodiments, the system 200 includes a worker communication component 210, shown in shadow in FIG. 2A. The system 200 includes a plurality of network traffic records 214a-n (referred to generally as network traffic record(s) 214). Each network traffic record 214 includes a plurality of fields 216. The hash generation component 206 generates one or more hashes 218a-n (referred to generally as hash(es) 218).

The exporter 106b may be a computing device 106 as described above in reference to FIGS. 1A-1C. The exporter 106b may be a router. The exporter 106b may be a switch. The exporter 106b may be a gateway computing device. The exporter 106b may be any computing device 100 configured to collect Internet protocol (IP) traffic statistics and export those statistics as network traffic records to another computing device 100. The exporter 106b may implement a network protocol to collect the IP traffic statistics. Examples of such network protocols include, without limitation, the NetFlow protocol developed by Cisco Systems, Inc. of San Jose, Calif.; the Jflow protocol developed by Juniper Networks, Inc. of Sunnyvale, Calif.; the IPFIX protocol developed by the Internet Engineering Task Force; and the s-flow protocol developed by NETGEAR, Inc. of San Jose, Calif.

The distributor 106a may be a computing device 106 as described above in reference to FIGS. 1A-1C. The distributor 106a may be a collector that collects IP traffic information from the exporter 106b (e.g., a network traffic record 214a). The distributor 106a may include functionality for communicating with the exporter 106b. For example, the distributor 106a may execute, or be in communication with, the exporter communication component 202. The distributor 106a may be a hardware-based collector of network traffic data. The distributor 106a may be a software-based collector.

The distributor 106a may include functionality for generating a user interface providing a user with access to collected network traffic data. Such a user interface may include user interface elements allowing users to review data analyses, request new analyses, and review data-related reports.

The distributor 106a may execute, or be in communication with, a distribution component 204. The distributor 106a may execute, or be in communication with, a hash generation component 206. The distributor 106a may include functionality for identifying a worker computing device 106c that should store the network traffic record 214a. For example, the distributor 106a may execute, or be in communication with, the worker identification component 208.

The distributor 106a may include functionality for communicating with worker computing devices 106c-n. The distributor 106a may include functionality for transmitting the network traffic record 214a to an identified worker computing device 106c. For example, the distributor 106a may execute, or be in communication with, the worker communication component 210.

The distributor 106a may include its own storage component 220 or may have access to a storage component 220a associated with a worker computing device 106c or other network-accessible storage component 220.

The distributor 106a may include functionality for requesting data from a plurality of worker computing devices 106c-n. The distributor 106a may include functionality for compiling a deduplicated enumeration of data received from the plurality of worker computing devices 106c-n. For example, the distributor 106a may execute, or be in communication with, a retrieval component 212.

The exporter communication component 202 may be a software program. The exporter communication component 202 may be a hardware module. The exporter communication component 202 may execute on the distributor 106a. The exporter communication component 202 may be in communication with the distribution component 204. The exporter communication component 202 may be part of the distribution component 204. In some embodiments, the exporter communication component 202 provides functionality allowing the distributor 106a to communicate with the exporter 106b. In other embodiments, the exporter communication component 202 provides functionality allowing the distributor 106a to process data received from the exporter 106b, such as a network traffic record 214a.

The distribution component 204 may be a software program. The distribution component 204 may be a hardware module. In one embodiment, the distribution component 204 includes functionality for communicating with the exporter communication component 202. In some embodiments, the distribution component 204 includes the functionality of the exporter communication component 202. In other embodiments, the distribution component 204 includes functionality for analyzing at least one network traffic record 214a received, directly or indirectly, from the exporter 106b. The distribution component 204 may include functionality for directing transmission of communications to one or more worker computing devices 106c-n. For example, the distribution component 204 may direct hardware or software network interfaces of the distributor 106a to transmit data to the worker computing devices 106c-n. As another example, the distribution component 204 may execute or be in communication with a worker communication component 210 that manages transmission of data to the worker computing devices 106c-n.

The hash generation component 206 may be a software program. The hash generation component 206 may be a hardware module. The distribution component 204 may execute the hash generation component 206. The hash generation component 206 provides functionality for applying a hash function to data within network traffic records 214. As one of ordinary skill in the art will understand, hash functions may take in data inputs and generate output with which the hash generator may populate a hash table. For example, the hash generation component 206 may include functionality for copying a portion of a network traffic record 214, provide the copied portion of the network traffic record 214 to a hash function, and use an output of the hash function as an index to a location in a data structure (e.g., a hash table) where the hash generation component 206 stores the copied portion of the network traffic record 214.

The worker identification component 208 may be a software program. The worker identification component 208 may be a hardware module. The distribution component 204 may execute the worker identification component 208.

The retrieval component 212 may be a software program. The retrieval component 212 may be a hardware module. The distributor 106a may execute the retrieval component 212. The retrieval component 212 may include functionality for directing transmission of communications to one or more worker computing devices 106c-n. For example, the retrieval component 212 may direct hardware or software network interfaces of the distributor 106a to transmit data to, or receive data from, the worker computing devices 106c-n. As another example, the retrieval component 212 may execute or be in communication with a worker communication component 210 that manages transmission of data to or from the worker computing devices 106c-n.

Figure 3:
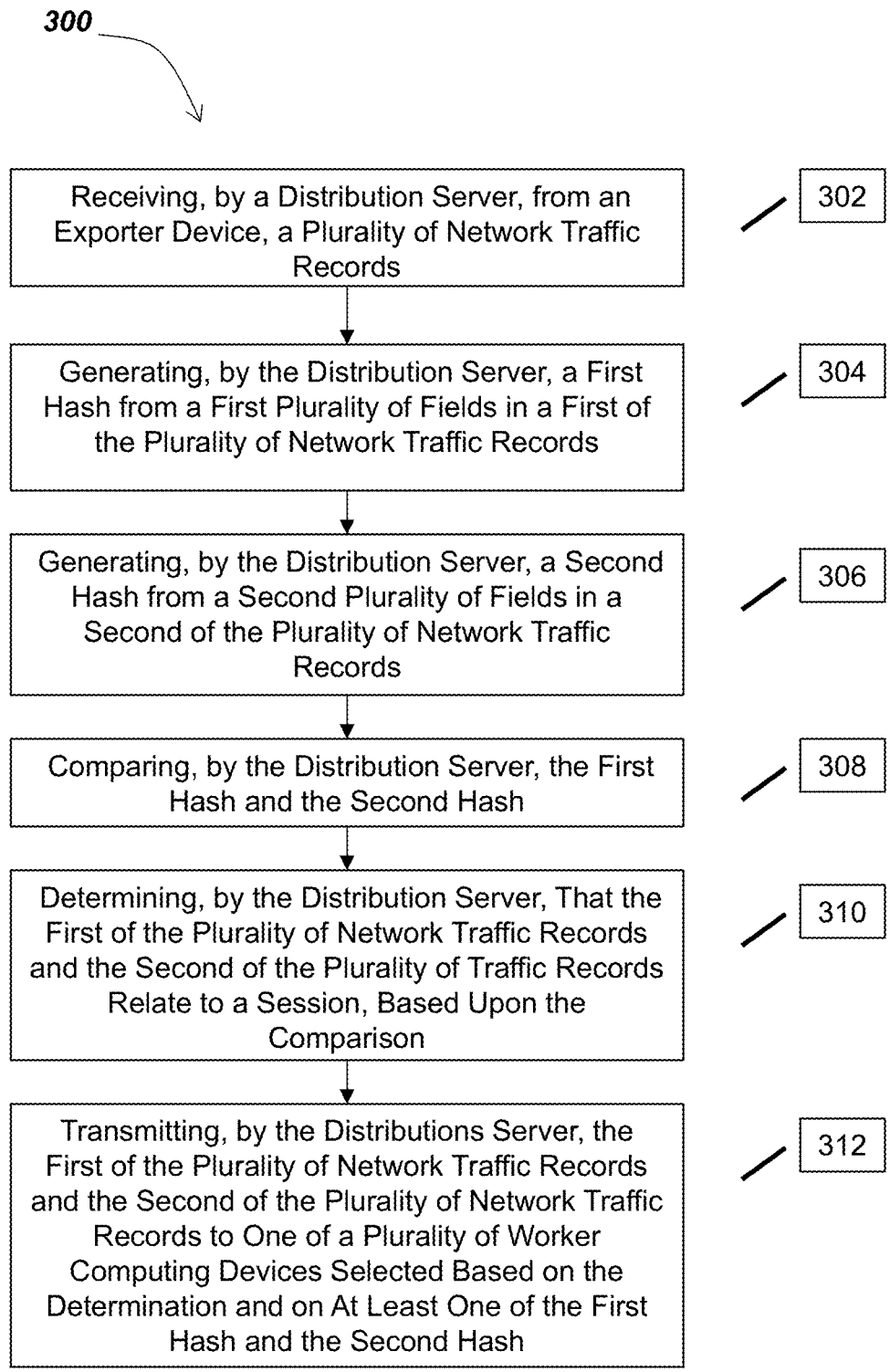
FIG. 3 is a flow diagram depicting one embodiment of a method for distribution of network traffic records.

Referring now to FIG. 3, a flow diagram depicts one embodiment of a method 300 for distribution and retrieval of network traffic records. In brief overview, the method 300 includes receiving, by a distribution server, from an exporter device, a plurality of network traffic records (302). The method includes generating, by the distribution server, a first hash from a first plurality of fields in a first of the plurality of network traffic records (304). The method includes generating, by the distribution server, a second hash from a second plurality of fields in a second of the plurality of network traffic records (306). The method includes comparing, by the distribution server, the first hash and the second hash (308). The method includes determining, by the distribution server, that the first of the plurality of network traffic records and the second of the plurality of traffic records relate to a session, based upon the comparison (310). The method includes transmitting, by the distributions server, the first of the plurality of network traffic records and the second of the plurality of network traffic records to one of a plurality of worker computing devices selected based on the determination and on at least one of the first hash and the second hash (312).

The method 300 includes receiving, by a distribution server, from an exporter device, a plurality of network traffic records (302). The distributor 106a may receive the plurality of network traffic records 214a-n from the exporter 106b. The exporter communication component 202 may receive the plurality of network traffic records 214a-n. The exporter 106b generates the network traffic records 214a-n based on network traffic. For example, if the exporter 106b is also a router receiving an IP data packet, directly or indirectly, from a client 102b and addressed to a destination computing device 106e (e.g., a destination server 106 on a second network 104c), the exporter may generate a network traffic record 214a (e.g., a NetFlow record) including data copied or derived from the packet. The distributor 106a may receive a plurality of network traffic records 214a-n, each of the plurality of network traffic records 214a-n including a source IP address. The distributor 106a may receive a plurality of network traffic records 214a-n, each of the plurality of network traffic records including a destination IP address. The distributor 106a may receive a plurality of network traffic records 214a-n, each of the plurality of network traffic records including a communications protocol. The distributor 106a may receive a plurality of network traffic records 214a-n, each of the plurality of network traffic records including a communications port. The distributor 106a may receive network traffic records 214a-n generated in accordance with protocols, such as, for example, the NetFlow protocol, and including traffic-related data, packet data, header data, and any data specified by the protocol.

Figure 2B:
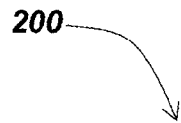
FIG. 2B is a block diagram depicting one embodiment of a network traffic record.

Referring now to FIG. 2B, a block diagram depicts one embodiment of a network traffic record 214. As shown in FIG. 2B, the network traffic record 214 may include a plurality of fields 216, each of which contains data. In one embodiment, the plurality of fields 216 include a client IP address, a client port number, a protocol (e.g., the protocol according to which a particular packet was transmitted), a server IP address, a server port, an exporter IP address, and an exporter version (e.g., a version of the protocol according to which the exporter 106b generated the network traffic record). In some embodiments, the network traffic record 214 includes additional information about network traffic (not shown), such as total bytes, total packets, start time (e.g., of a session), last update, quality of service metrics, virtual local area network data, and other packet- and session-related data. In some embodiments, the network traffic record 214 includes fewer fields 216 than shown in FIG. 2B. The distributor 106 may use data from any one or more of the fields 216 to identify, directly or indirectly, a worker computing device 106c that should store the network traffic record 214a. The plurality of fields 216 may be referred to as a "tuple."

In some embodiments, the network traffic record 214 includes additional annotations. In one of these embodiments, the network traffic record 214 includes an identification of a country to which each IP address belongs (e.g., according to outside data provided by the Internet Assigned Numbers Authority (IANA)). In another of these embodiments, the network traffic record 214 includes an identification of an Autonomous System to which each IP address belongs (e.g., according to outside data provided by the IANA). In still another of these embodiments, the network traffic record 214 includes an identification of a traffic group to which each IP address belongs, if any, according to a rule set given by a user. In another of these embodiments, the network traffic record 214 includes a "friendly name" (e.g., human readable and/or alphanumeric alias assigned by a user) for each IP address. In still another of these embodiments, the network traffic record 214 includes data specified in a rule set provided by a user.

As an example of a network traffic record 214 including one or more additional annotations, if the network traffic record 214 shows traffic from IP 1.2.3.4 addressed to IP 5.6.7.8, on server port 80, the system 200 provides functionality for determining that address 1.2.3.4 is in a block of IP addresses assigned to Finland in an autonomous system owned by Nokia; the system 200 provides functionality for determining that address 5.6.7.8 is in a block of IP addresses assigned to the United States and that is not part of an autonomous system and that is assigned to a particular traffic group (e.g., by applying one or more user-specified traffic group rules and determining that a user assigned address 5.6.7.8 to "traffic group 6", for example); the system 200 provides functionality for determining that a user specified that address 1.2.3.4 should be referred to as "My Mobile Phone", that traffic group 6 should be referred to as "My home network", and that port 80 should be referred to as "Web browsing." Continuing with this example, the network traffic record 214 may be annotated to include countries (Finland, US) autonomous system (Nokia), traffic group (6) and friendly names ("My Nokia Phone", "MY Home Network", and "Web Browsing").

Referring back to FIG. 3, the method includes generating, by the distribution server, a first hash from a first plurality of fields in a first of the plurality of network traffic records (304). In one embodiment, the distribution component 204 receives the network traffic record 214 and requests the generation of the first hash by the hash generation component 206. The distribution component 204 may provide the hash generation component 206 with an identification of a plurality of fields 216 from the network traffic record 214 to use in generating the first hash. The distribution component 204 may provide the hash generation component 206 with the data from the plurality of fields 216. The distribution component 204 may provide the hash generation component 206 with an instruction for how to access the network traffic record 214 (e.g., by identifying where in memory (local or remote) the data from the plurality of fields 216 is stored). In another embodiment, the hash generation component 206 receives the network traffic record 214 from the exporter communication component 202 and extracts the data from the plurality of fields 216 to generate the first hash. In still another embodiment, the hash generation component 206 periodically polls a component (such as, by way of example and without limitation, the exporter communication component 202) to determine whether there is a new network traffic record 214 available.

The hash generation component 206 may be programmable to retrieve data from a particular plurality of fields 216 upon receiving the network traffic record 214, whether the hash generation component 206 receives the network traffic record 214, or the data contained in the plurality of fields, from the exporter communication component 202, from the distribution component 204, directly from the exporter 106b, or from a storage element associated with the distributor 106a. In some embodiments, the distributor 106 provides a user interface with which a user may specify the plurality of fields 216 to use in generating the hash.

The hash generation component 206 applies a hashing function to data from the plurality of fields 216 to generate the first hash. In some embodiments, the hash generation component 206 executes the hashing function using a numerical value associated with a source IP address and to a numerical value associated with a destination IP address, the source and destination IP addresses included in a network traffic record 214a. In other embodiments, the hash generation component 206 executes the hashing function using the data from the plurality of fields 216, including, by way of example and without limitation, source IP address, destination IP address, source port, destination port, protocol, IP address of the exporter 106b, interface identifier of the exporter 106b, and version of a network traffic record generation protocol according to which the exporter 106b generated the network traffic record 214. The values of the plurality of fields 216 may be concatenated into a single number for purposes of generating the hashes. For example, a session describing 1.2.3.4 connecting to 5.6.7.8 from port 65000 to port 80 via TCP (protocol 6) from exporter 10.11.12.13 on interface 0 would give the key: 0x01020304fde805060708050060a0b0c0d00 (which is, by way of example and without limitation, all of the numbers listed in order, in hexadecimal); this key in turn would be processed through the hash function to get a 32-bit hexadecimal number that is, in one example, and without limitation, the hash: 0x7ff35a01.

Upon generation of a first hash, the distributor 106 may identify a worker computing device 106c to store a first network traffic record 214a. For example, the distributor 106 assign a range of hash values to each of the plurality of worker computing devices 106c-n and may use a portion of the first hash (e.g., a certain number of alphanumeric values at the beginning of the hash) to determine which of the worker computing devices 106c-n will store the network traffic record 214a. However, before distributing the network traffic record 214a to the worker computing device 106c, the distributor 106a may wait to receive a second network traffic record 214b, generate a second hash, and determine that the first network traffic record 214a and the second network traffic record 214b are associated with a single communications session; at that point the distributor 106 may distribute both the first and second network traffic records 214a and 215b to the same worker computing device 106c. By way of example, and without limitation, in some embodiments, the distributor 106a receives a plurality of network traffic records 214a-n (e.g., a batch) within a particular time frame (e.g., substantially at the same time, within a predetermined period of time, or within a user-specified period of time), and the distribution component 204 may direct the generation of the hashes for each of the plurality of network traffic records 214 before beginning a distribution process. The distributor 106a may pair network traffic records 214 with matching hashes to identify the records that are associated with a single communications session. The distribution component 204 may numerically sort the batch of network traffic records 214 (e.g., by IP address and port) before generating the hashes so that the hash for each record in a communication session comes out the same.

The method includes generating, by the distribution server, a second hash from a second plurality of fields in a second of the plurality of network traffic records (306). In one embodiment, the distributor 106a generates the second hash as described above in connection with generation of the first hash. Generating the second may include executing a hashing function using a numerical value associated with a source IP address and a numerical value associated with a destination IP address, the source and destination IP addresses include in a network traffic record 214b.

The method includes comparing, by the distribution server, the first hash and the second hash (308). In one embodiment, the distribution component 204 compares the first hash and the second hash, generated by the hash generation component 206. In some embodiments, the worker identification component 208 compares the first hash and the second hash.

Referring now to FIG. 2C, a block diagram depicts one embodiment of a plurality of hashes generated by the hash generation component 206. As one of ordinary skill in the art will recognize, executing a hashing function with a first value to generate a first output and executing the hashing function with a second value to generate a second output will result in the first output equaling the second output if the first value and the second value are the same. By way of example, and as depicted in FIG. 2C, the hash generation component 206 may generate a first hash 218a and a second hash 218b using data from the same pluralities of fields from two different network traffic records. Since the data is the same in both records (by way of example in FIG. 2C, 1.2.3.4, 5.6.7.8, 65000, 80, 6, 10.11.12.13, and 0), the hash output is the same in hash 218a as it is in hash 218b. However, since the data input to the hashing function from the plurality of fields 216c is different in the example shown in FIG. 2C (e.g., 10.0.0.2 and 192.168.1.3), the hash output in hash 218c is different from the hash 218a and the hash 218b.

Referring back to FIG. 3, the method includes determining, by the distribution server, that the first of the plurality of network traffic records and the second of the plurality of traffic records relate to a session, based upon the comparison (310). The worker identification component 208 may compare two hashes to determine whether two network traffic records 214a and 214b are associated with a particular session. The two hashes may relate to a single communications session. For example, data in the plurality of fields 216 from the first network traffic record 214a may indicate that the network traffic record 214a had a source IP address of a client machine on the network 104b and a destination address of a computing device 106e on the Internet (e.g., a server providing the client with data), while data in the plurality of fields 216 from the second network traffic record 214b identifies a destination IP address of the client machine on the network 104b and a source address of the computing device 106e; in such an example, the data from the plurality of fields 216 in both records is the same (e.g., the same IP addresses are provided but as values for different fields) and the output of the hashing function will be the same. Continuing with this example, the two network traffic records likely relate to a single communications session between the client machine and the destination computing device 106e. In some embodiments, additional fields are included in the hash.

The method includes transmitting, by the distributions server, the first of the plurality of network traffic records and the second of the plurality of network traffic records to one of a plurality of worker computing devices selected based on the determination and on at least one of the first hash and the second hash (312). In some embodiments, the distributor 106a assigns each worker computing device 106c-n an arbitrary range of values and when the first hash (and by extension the second hash) falls into the range of values assigned to a particular worker computing device 106c, the distributor 106a transmits the first network traffic record 214a and the second network traffic record 214b to the worker computing device 106c.

For example, the distributor 106a may determine that when a hash begins with a number of digits beginning with 0001 through 9999, the associated network traffic record 214a is assigned to worker computing device 106c. As another example, the distributor 106a may determine record distribution based on modulo division (e.g., instead of dividing the range into blocks, the hash is divided by the number of workers and assigned according to the remainder). Continuing with this example, if a hash for a particular record is, for example and without limitation, 7000 and we have three workers, we divide 7000 by 3 and 2333 remainder 1 and so assign that record to the first worker.

In some embodiments, the worker identification component 208 assigns the range of values to the worker computing devices 106c-n and determines which particular worker computing device 106c should receive a particular network traffic record 214 based on the value of the hash 218 generated from data in the network traffic record 214. The worker identification component 208 may transmit the network traffic records 214a and 214b to the assigned worker computing device 106c. The worker identification component 208 may transmit the first hash 218a generated from data in a first network traffic record 214a and transmit the second hash 218b generated from data in a second network traffic record 214b to the assigned worker computing device 106c. The worker identification component 208 may transmit the first network traffic record 214a and the second network traffic record 214b instead of, or in addition to the first and second hashes. In embodiments in which the worker identification component 208 transmits the network traffic records 214 instead of the hashes 218, the assigned worker computing device 106c may recreate the hashes, either at the time of receiving the network traffic records 214 or when receiving a request for retrieval of data, described in further detail below.

The system 200 may store data in hash tables including linked lists that can grow as more pairings are added; for example, if a worker computing device 106c receives a third network traffic record 214c associated with the same communications session as the network traffic record 214a and the network traffic record 214b, the worker computing device 106c may add the network traffic record 214c to a linked list of values including data values from the network traffic record 214a and the network traffic record 214b.

Rather than evenly or arbitrarily divide records up amongst the plurality of worker computing devices 106c, the methods and systems described herein distribute network traffic records 214 in a fashion that ensures that network traffic records, and subsequent updates, associated with the same network communication session are distributed to the same worker computing device 106c.

The methods and systems described above provide scalable functionality for reliably distributing traffic records amongst a plurality of worker computing devices. The methods and systems described herein may also provide functionality for performing real-time queries of distributed data and on providing responses to such queries based on partial responses from each of the plurality of worker computing devices. The methods and systems described herein may provide further functionality for maintaining quickly searchable lists of pairings; for example, such functionality may allow for generation of accurate unique-count IP addresses ranked according to various pre-determined and/or user-specified criteria.

Figure 4:
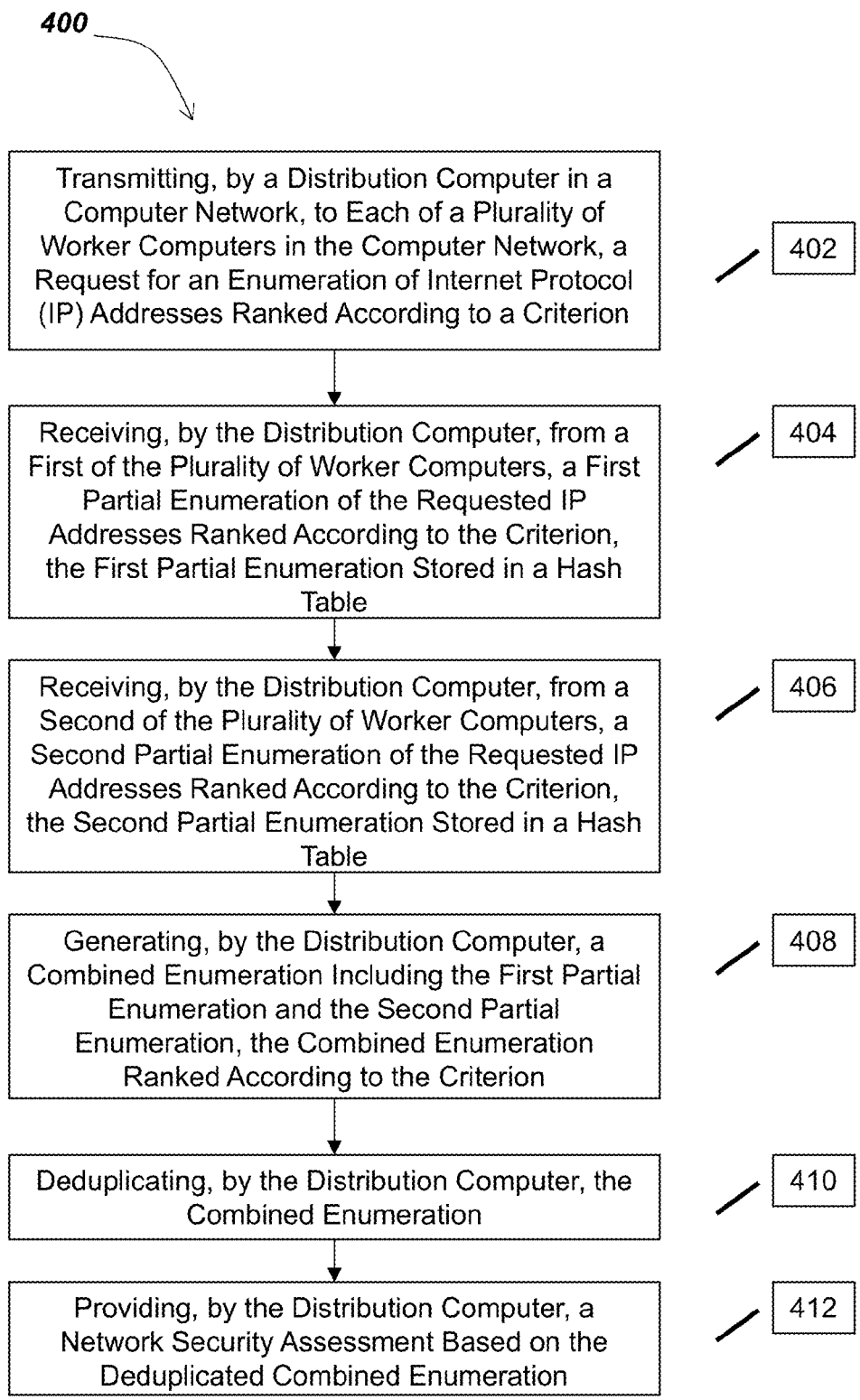
FIG. 4 is a flow diagram depicting one embodiment of a method for retrieving distributed network traffic records and providing network security assessments based upon the retrieved records.

Referring now to FIG. 4, a flow diagram depicts one embodiment of a method 400 for retrieving distributed network traffic records and providing network security assessments based upon the retrieved records. The method 400 includes transmitting, by a distribution computer in a computer network, to each of a plurality of worker computers in the computer network, a request for an enumeration of Internet Protocol (IP) addresses ranked according to a criterion (402). The method 400 includes receiving, by the distribution computer, from a first of the plurality of worker computers, a first partial enumeration of the requested IP addresses ranked according to the criterion, the first partial enumeration stored in a hash table (404). The method 400 includes receiving, by the distribution computer, from a second of the plurality of worker computers, a second partial enumeration of the requested IP addresses ranked according to the criterion, the second partial enumeration stored in a hash table (406). The method 400 includes generating, by the distribution computer, a combined enumeration including the first partial enumeration and the second partial enumeration, the combined enumeration ranked according to the criterion (408). The method 400 includes deduplicating, by the distribution computer, the combined enumeration (410). The method 400 includes providing, by the distribution computer, a network security assessment based on the deduplicated combined enumeration (412).

The method 400 includes transmitting, by a distribution computer in a computer network, to each of a plurality of worker computers in the computer network, a request for an enumeration of IP addresses ranked according to a criterion (402). The distributor 106a transmits the request to each of the worker computing devices 106c-n. In one embodiment, the retrieval component 212 transmits the request to each of the worker computing devices 106c-n. In some embodiments, the distributor 106a transmits the request to the worker computing devices 106c-n upon receiving a request from a user. For example, the distributor 106a may provide a user interface with which a user may request an enumeration of ranked IP addresses and specify the criteria according to which the IP addresses should be ranked. In other embodiments, the distributor 106a transmits the request to the worker computing devices 106c-n periodically. For example, the distributor 106a may be programmable to automatically request ranked IP addresses at predetermined (e.g., hard-coded or user-specified) points in time (e.g., hourly, daily, monthly). In some embodiments, a user requests the enumeration of IP addresses indirectly. For example, the user may request a network security assessment that relies at least in part on an enumeration of IP addresses. As another example, the user may request a report of network activity that relies at least in part on an enumeration of IP addresses. One of ordinary skill in the art will understand that although described herein in the context of requests for enumerations of IP addresses, the distributor 106 may transmit requests for enumeration of network traffic data of any type, including, without limitation, port identifiers, protocol identifiers, and so on.

The distributor 106a may transmit a request for an enumeration of IP addresses identified as a destination address in each of a plurality of network traffic records, the enumeration ranked according to the criterion. The distributor 106a may transmit a request for an enumeration of IP addresses identified as a source address in each of a plurality of network traffic records, the enumeration ranked according to the criterion. The distributor 106a may transmit a request for an enumeration of IP addresses associated with a protocol identified in each of a plurality of network traffic records, the enumeration ranked according to the criterion. The distributor 106a may transmit a request for an enumeration of IP addresses associated with a port identified in each of a plurality of network traffic records, the enumeration ranked according to the criterion.

Criteria may include identifying how many unique IP addresses a particular computer has contacted; for example, enumerating IP addresses of the top n most active computing devices 100 (e.g., a client device 102b on the network 104b contacted 1000 unique computing devices within a particular time period, a client device 102c (not shown) contacted 900 unique computing devices, and a client device 102d (not shown) contacted 800 unique computing devices). Criteria may include identifying IP addresses most frequently contacted by a specified computing device 100 (e.g., what are the top ten IP addresses most frequently contacted by a particular computing device 100). Criteria may also include identifying IP addresses according to a number of unique countries or autonomous systems contacted, or the most individual sessions started, or the number of unique ports contacted. It should be noted that other ranking criteria might be used at other times and integrated into the process. In some embodiments, rankings or prioritization based on any field in the plurality of fields 216 may be used as criteria. In other embodiments, rankings or prioritization based on any annotations added by the system 200 to the network traffic record 214 may be used as criteria. In further embodiments, a user selects values to be used in generating a primary hash key and a secondary hash key; the values may also function as search criteria. In one of these embodiments, for example, the user may interact with a user interface to indicate that the system should retrieve IP addresses sorted by unique port; in such an example, the primary hash key will be the IP address and the secondary hash key will be the port number. As another example, the user may indicate that the hash key should be based on data added to a network traffic record 214, such as a country name or an autonomous system name.

In some embodiments, the distributor 106a distributed a plurality of network traffic records 214a-n as described above in connection with FIG. 3. In such embodiments, the distributor 106a transmitted the network traffic records 214 to the plurality of worker computing devices 106c-n based upon a portion of the hashes generated for each of the network traffic records 214 (as a simple example for purposes of illustration only, hashes beginning with letters A-D may be distributed to the worker computing device 106c, hashes beginning with letters E-H are distributed to the worker computing device 106d, etc.). The methods and systems described above provide efficient, scalable functionality for distributing the work of storing and maintaining a plurality of network traffic records 214. The distributor 106a may therefore provide functionality for querying multiple worker computing devices 106c-n, each of which may store records relevant to the search. For example, the distributor 106a may execute such functionality should the distributor 106a perform a query to retrieve data from a plurality of network traffic records 214 (e.g., search for all network traffic records 214 in which a particular field includes particular data, such as a particular source IP address). The distributor 106a may provide functionality for executing queries and retrieving data without requiring the worker computing devices 106c-n to communicate with each other. In some embodiments, the distributor 106a provides functionality that leverages the nature and structure of network session data in determining how to distribute data to, and retrieve data from, worker computing devices 106c-n; for example, by leveraging the knowledge that a given communication may be characterized in terms of certain fields (e.g., participants and ports) while other fields may be useful for an end analysis (e.g., timestamps).

The method 400 includes receiving, by the distribution computer, from a first of the plurality of worker computers, a first partial enumeration of the requested IP addresses ranked according to the criterion, the first partial enumeration stored in a hash table (404). The distributor 106a may receive the first partial enumeration. The retrieval component 212 may receive the first partial enumeration.

In one embodiment, when a worker computing device 106c receives the request from the distributor 106c, the worker computing device 106c searches a hash table or network traffic record 214 to find data relating to the request. For example, if the worker computing device 106c receives a request for an enumeration of destination IP addresses contacted by a particular source IP address (e.g., a client 102 on the network 104b), the worker computing device 106c searches a plurality of previously received network traffic records 214a-n for network traffic records 214a-n that include the source IP address (or other search criteria). The worker computing device 106c may generate a hash table storing data from each of the network traffic records 214a-n that include the search criteria. As an example, if the worker computing device 106c determines that a machine with IP address 1.2.3.4 contacted a machine with IP address 5.6.7.8, the worker computing device 106c may search a hash table for an entry matching 1.2.3.4 and add a numerical representation of 5.6.7.8 to the entry. Continuing with this example, and in the event that the machine with IP address 1.2.3.4 contacted 5.6.7.8 a second time in a different communication, the worker computing device 106c may annotate the hash table to indicate that 5.6.7.8 appears twice (e.g., by adding the indication a second time, increasing a counter, or otherwise annotating the entry for 1.2.3.4 to indicate a second communication with 5.6.7.8). The worker computing device 106c may then transmit the hash table (e.g., the partial enumeration) to the distributor 106a.

As another example, the worker computing device 106c may receive a request for an enumeration of machines satisfying criteria such as, by way of example, and without limitation, the top ten machines generating the most sessions with computing devices having destination IP addresses outside the network 104b. In this example, the worker computing device 106c may generate a hash table where the key is generated based on the criteria—in this instance, for example, source IP of each machine to be ranked. Continuing with this example, the worker computing device 106c then filters the sessions for which it has data (e.g., the received network traffic records 214) to generate a list of sessions for each machine where the destination IP address is an address outside the network 104b (e.g., by ordering the sessions according to destination IP address and removing any sessions in which the destination IP address is an address inside the network 104b). Continuing with this example, the worker computing device 106c may then analyze each session in the filtered list, identify the receiving machine in the hash table (using the machine IP address as the key), and update the partial enumeration to include the new information. As an example of updating the partial enumeration, the worker computing device 106c may use the IP address of the receiving machine as a key and add the destination address (from each analyzed session in the filter list) to the entry in the hash table for the receiving machine.

Figure 2D:
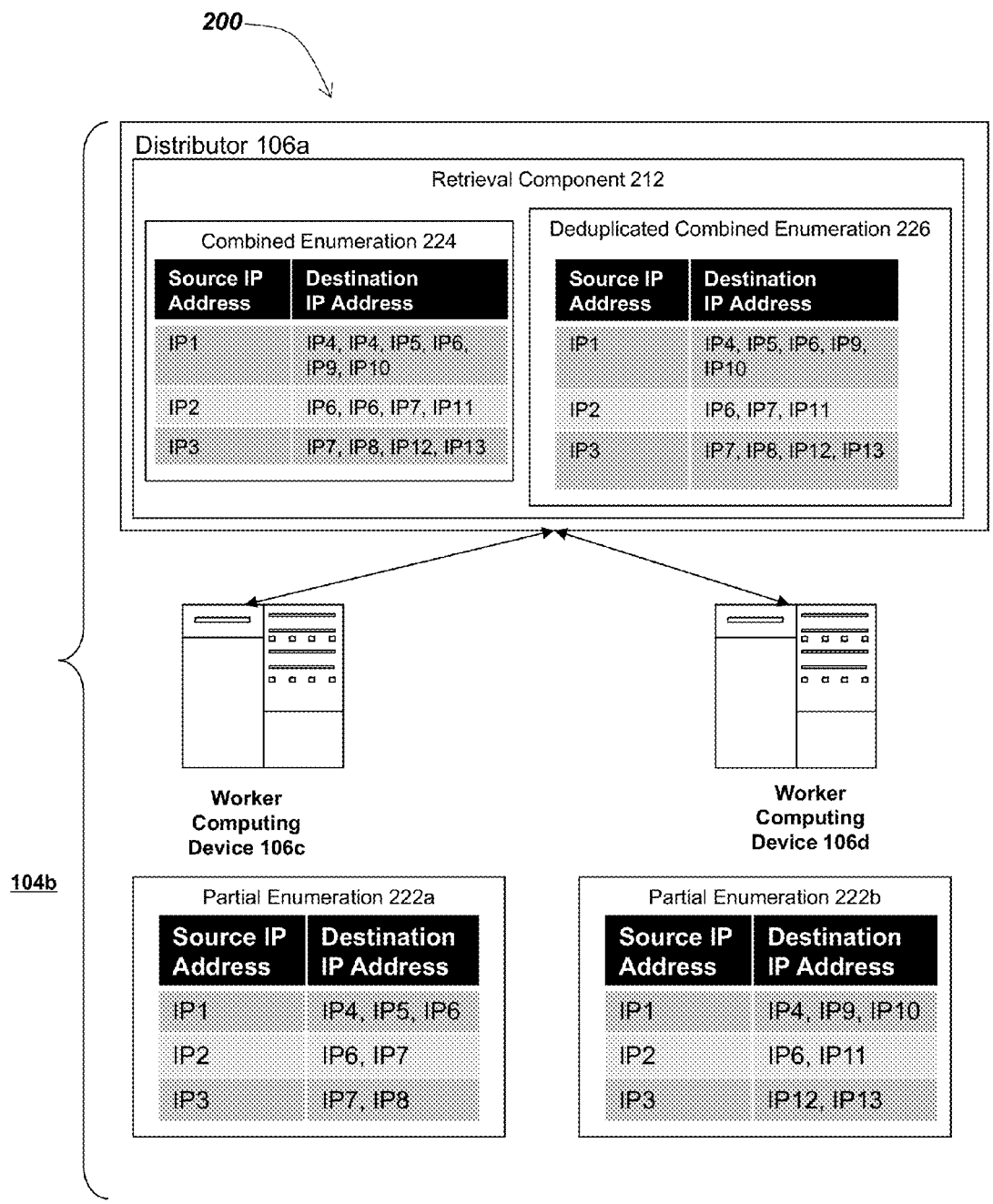
FIG. 2D is a block diagram depicting one embodiment of partial enumerations, of a combined enumeration, and of a deduplicated combined enumeration.

Referring now to FIG. 2D, a block diagram depicts one embodiment of partial enumerations 222a-b, a combined enumeration 224, and a deduplicated combined enumeration 226. Although depicted in human readable alphanumeric text in FIG. 2D, the data stored by the computing devices may actually be stored in hash tables. In some embodiments, the data depicted in FIG. 2D is stored in hash tables for speed of insertion and retrieval. In one embodiment, the worker computing device 106c generates a new hash table containing the data identified in its search of stored network traffic record data; the new hash table forms the first partial enumeration 222a. The worker computing device 106c may rank the items in the partial enumeration based on the number of entries of pairings in their individual hash tables. The worker computing device 106c transmits the partial enumeration 222a to the distributor 106a. The distributor 106a combines all the partial enumerations 222a-n into a combined enumeration 224 and then generates a deduplicated combined enumeration 226, as will be discussed in greater detail below.

Referring back to FIG. 4, the method 400 includes receiving, by the distribution computer, from a second of the plurality of worker computers, a second partial enumeration of the requested IP addresses ranked according to the criterion, the second partial enumeration stored in a hash table (406). The distributor 106a may receive the second partial enumeration. The retrieval component 212 may receive the second partial enumeration. A worker computing device 106d may generate and provide the second partial enumeration to the distributor 106a as described above in connection with the first partial enumeration.

The method 400 includes generating, by the distribution computer, a combined enumeration including the first partial enumeration and the second partial enumeration, the combined enumeration ranked according to the criterion (408).

The method 400 includes deduplicating, by the distribution computer, the combined enumeration (410). Partial enumerations 222 returned from each worker computing device 106c-n may include overlapping data (e.g., a key in the hash tables). In one embodiment, the retrieval component 212 automatically deduplicates the combined enumeration 224. For example, the retrieval component 212 may perform hash table merging to merge and automatically deduplicate partial enumerations 222. The retrieval component 212 may merge ranked items in partial enumerations 222a with other ranked items from partial enumerations 222b-n received by the retrieval component 212. The retrieval component 212 may remove duplicates from the combined enumeration 224, ensuring the resulting hash table (deduplicated combined enumeration 226) provides an accurate unique-item count.

In some embodiments, to preserve processing time or accommodate memory constraints, the retrieval component 212 may remove lower-ranked items from the enumeration. Similarly, pairings of low rank can be removed from the hash tables and counted in an overflow.

In pre-filtering the list of sessions according to criteria, each of the worker computing devices 106 perform the same pre-filtering in parallel (each on a non-overlapping set of sessions) and the result is a set of hash tables that can be merged by the distributor 106a—if worker computing device 106c reports that IP XYZ got 10 data requests and worker computing device 106d reports that IP XYZ got 9 data requests, the retrieval component 212 may determine that IP XYZ got 19 requests since worker computing device 106c and worker computing device 106d used the same criteria but looked up different data resulting in a mutually exclusive, collectively exhaustive approach.

The method 400 includes providing, by the distribution computer, a network security assessment based on the deduplicated combined enumeration (412). In one embodiment, the distributor 106a generates a behavioral fingerprint associated with a computer 102 in the computer network 104b based upon the deduplicated combined enumeration. In another embodiment, the distributor 106a generates the behavioral fingerprint by identifying an abnormal communications pattern in the deduplicated combined enumeration. For example, and without limitation, the distributor 106a may generate a behavior fingerprint for a client 102b based upon the deduplicated combined enumeration generated by the retrieval component 212. By way of example, the retrieval component 212 may generate a deduplicated combined enumeration indicating that the client 102b contacted 400,000 unique IP addresses associated with networks outside the network 104b while the next most active client 102c (not shown) contacted only 400 unique IP addresses associated with networks outside the network 104b; the distributor 106a may determine that the client 102b has therefore displayed an aberrational behavior and generate a network security assessment indicating that the client 102b has a higher probability of being a security risk (e.g., having been infected by a computer virus). The distributor 106a may provide the network security assessment to a user (e.g., an administrator). The distributor 106a may provide the network security assessment to another computing device 106 on the network 104b.

In some embodiments, the distributor 106a does not generate the network security assessment but provides the deduplicated combined enumeration to a computing device 106 on the network 104b that generates network security assessments, for example, by combining output from the distributor 106a with output from other network security forensics software or hardware executing on the network 104b (e.g., intrusion detection systems, virus scanners, computer forensics applications, or other hardware or software security components). Therefore, providing the network security assessment (412) may be optional. In other embodiments, the distributor 106a does generate the network security assessment and provides the assessment to another computing device 106 on the network 104b that combines network security assessments from a variety of sources, including the distributor 106a, to generate a complete assessment.

Figure 5:
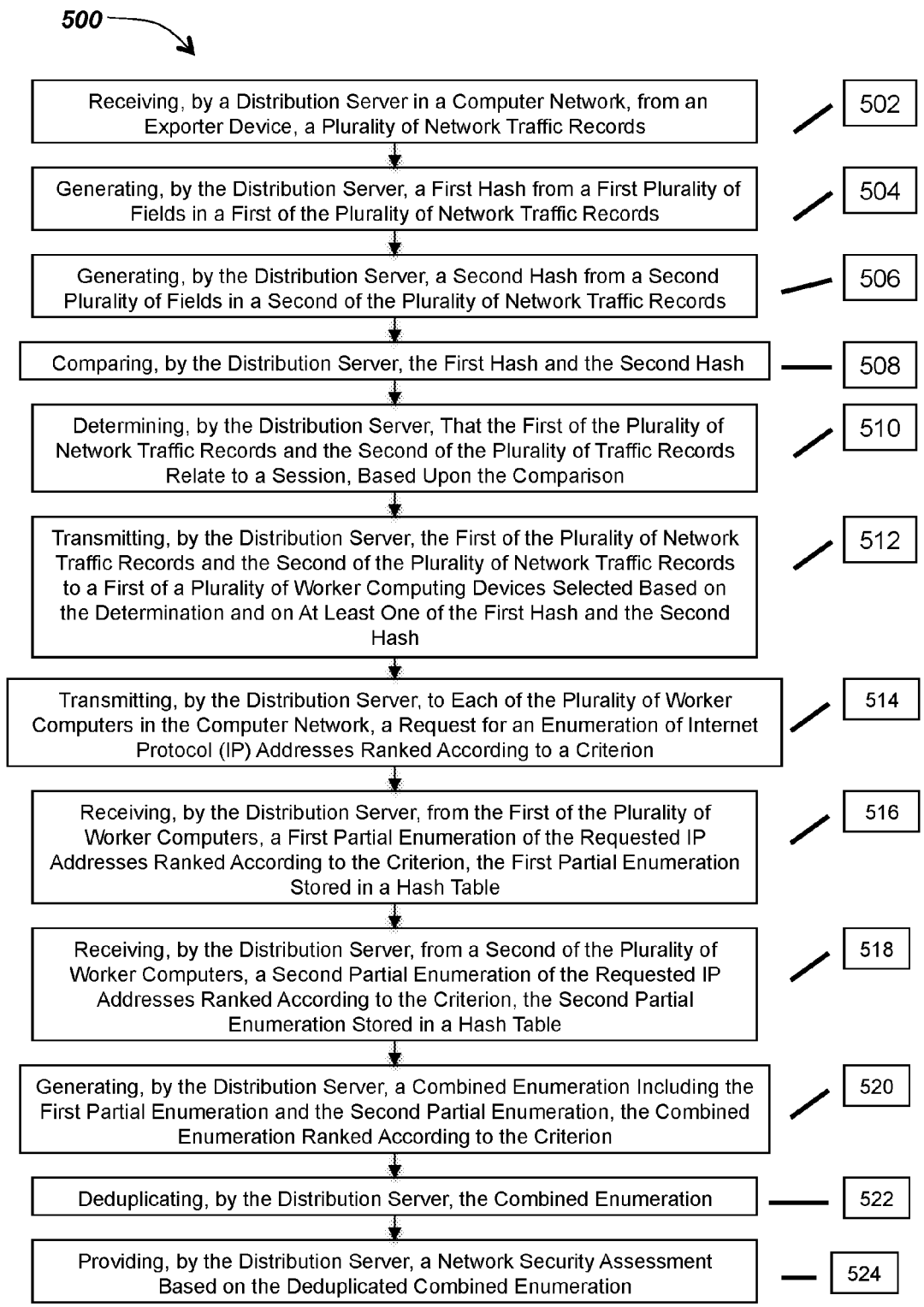
FIG. 5 is a flow diagram depicting one embodiment of a method for distributing network traffic records, retrieving distributed network traffic records, and providing network security assessments based upon the retrieved records.

Referring now to FIG. 5, a flow diagram depicts one embodiment of a method 500 for distributing network traffic records, retrieving distributed network traffic records, and providing network security assessments based upon the retrieved records. The method 500 includes receiving, by a distribution server in a computer network, from an exporter device, a plurality of network traffic records (502). The method 500 includes generating, by the distribution server, a first hash from a first plurality of fields in a first of the plurality of network traffic records (504). The method 500 includes generating, by the distribution server, a second hash from a second plurality of fields in a second of the plurality of network traffic records (506). The method 500 includes comparing, by the distribution server, the first hash and the second hash (508). The method 500 includes determining, by the distribution server, that the first of the plurality of network traffic records and the second of the plurality of traffic records relate to a session, based upon the comparison (510). The method 500 includes transmitting, by the distribution server, the first of the plurality of network traffic records and the second of the plurality of network traffic records to a first of a plurality of worker computing devices selected based on the determination and on at least one of the first hash and the second hash (512). The method 500 includes transmitting, by the distribution server, to each of the plurality of worker computers in the computer network, a request for an enumeration of Internet Protocol (IP) addresses ranked according to a criterion (514). The method 500 includes receiving, by the distribution server, from the first of the plurality of worker computers, a first partial enumeration of the requested IP addresses ranked according to the criterion, the first partial enumeration stored in a hash table (516). The method 500 includes receiving, by the distribution server, from a second of the plurality of worker computers, a second partial enumeration of the requested IP addresses ranked according to the criterion, the second partial enumeration stored in a hash table (518). The method 500 includes generating, by the distribution server, a combined enumeration including the first partial enumeration and the second partial enumeration, the combined enumeration ranked according to the criterion (520). The method 500 includes deduplicating, by the distribution server, the combined enumeration (522). The method 500 includes providing, by the distribution server, a network security assessment based on the deduplicated combined enumeration (524). The method depicted in FIG. 5 may be provided by executing the method described in connection with FIG. 3 in combination with executing the method described in connection with FIG. 4.

In some embodiments, the methods and systems described herein provide network administrators with functionality for improved distribution and analyses of sources of network traffic, destinations for network traffic, and amounts of network traffic. Furthermore, the systems and methods described herein may also provide functionality for identifying unique-count network objects on one or more networks and creating the network objects into a database where further analysis may be performed, as well as for interfacing with third party systems to rapidly detect network events or entities such as data exfiltrations, DDoS attack sources, botnets, spam relays, zero-day worms, host and network scans, DNS amplification attacks, and brute-force attempts.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment.

The techniques described above may be implemented as a method, apparatus, or article of manufacture using programming and/or engineering techniques to produce software, firmware, hardware, or any combination thereof. The techniques described herein may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices. As indicated above, software (also referred to herein as components, modules, programs, program code, and applications) may include virtual machines and virtualized software.

Any of the functions disclosed herein may be implemented using means for performing those functions. Such means include, but are not limited to, any of the components disclosed herein.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing computer program instructions tangibly embodied on a non-transitory computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for distribution and retrieval of network traffic records, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for distributing network traffic records, performed by at least one computer processor executing computer program instructions stored on at least one non-transitory computer-readable medium, the method comprising:
   receiving, by a distribution server, from an exporter device, a plurality of network traffic records;
   generating, by the distribution server, a first hash from a first plurality of fields in a first of the plurality of network traffic records;
   generating, by the distribution server, a second hash from a second plurality of fields in a second of the plurality of network traffic records;
   comparing, by the distribution server, the first hash and the second hash;
   determining, by the distribution server, that the first of the plurality of network traffic records and the second of the plurality of traffic records relate to a session, based upon the comparison; and
   transmitting, by the distributions server, the first of the plurality of network traffic records and the second of the plurality of traffic records to one of a plurality of worker computing devices selected based on the determination and on at least one of the first hash and the second hash.

2. The method of claim 1, wherein receiving further comprises receiving, by the distribution server, from the exporter device, the plurality of network traffic records, each of the plurality of network traffic records including a source Internet Protocol (IP) address.

3. The method of claim 1, wherein receiving further comprises receiving, by the distribution server, from the exporter device, the plurality of network traffic records, each of the plurality of network traffic records including a destination Internet Protocol (IP) address.

4. The method of claim 1, wherein receiving further comprises receiving, by the distribution server, from the exporter device, the plurality of network traffic records, each of the plurality of network traffic records identifying a communications protocol.

5. The method of claim 1, wherein receiving further comprises receiving, by the distribution server, from the exporter device, the plurality of network traffic records, each of the plurality of network traffic records identifying at least one communications port.

6. The method of claim 1, wherein generating the first hash further comprises executing a hashing function using a numerical value associated with a source Internet Protocol (IP) address and a numerical value associated with a destination Internet Protocol (IP) address.

7. The method of claim 1, wherein generating the second hash further comprises executing a hashing function using a numerical value associated with a source Internet Protocol (IP) address and a numerical value associated with a destination Internet Protocol (IP) address.

8. A non-transitory computer readable medium comprising computer program instructions tangibly stored on the computer readable medium, wherein the computer program instructions are executable by at least one computer processor to perform a method for distributing network traffic records, the method comprising:
   receiving, by a distribution server, from an exporter device, a plurality of network traffic records;
   generating, by the distribution server, a first hash from a first plurality of fields in a first of the plurality of network traffic records;
   generating, by the distribution server, a second hash from a second plurality of fields in a second of the plurality of network traffic records;
   comparing, by the distribution server, the first hash and the second hash;
   determining, by the distribution server, that the first of the plurality of network traffic records and the second of the plurality of traffic records relate to a session, based upon the comparison; and
   transmitting, by the distributions server, the first of the plurality of network traffic records and the second of the plurality of traffic records to one of a plurality of worker computing devices selected based on the determination and on at least one of the first hash and the second hash.

* * * * *